United States Patent [19]

Cunningham et al.

[11] 4,425,011

[45] Jan. 10, 1984

[54] POLYMER CAGE FOR A HIGH SPEED TAPERED ROLLER BEARING

[75] Inventors: Robert J. Cunningham, Canton; Peter S. Orvos, Uniontown, both of Ohio

[73] Assignee: The Timken Company, Canton, Ohio

[21] Appl. No.: 385,706

[22] Filed: Jun. 7, 1982

[51] Int. Cl.³ .................... F16C 33/46; F16C 33/66
[52] U.S. Cl. ................................ 308/214; 308/187; 308/217; 308/218
[58] Field of Search ............... 308/211, 214, 218, 187, 308/217, 201

[56] References Cited

U.S. PATENT DOCUMENTS

| | | | |
|---|---|---|---|
| 3,477,773 | 11/1969 | Altson | 308/214 |
| 3,628,835 | 12/1971 | Cornish | 308/187 |
| 3,733,111 | 5/1973 | Harlan et al. | 308/218 |
| 3,743,369 | 7/1973 | Langstrom | 308/201 |
| 3,782,795 | 1/1974 | Richey et al. | 308/214 |
| 4,222,620 | 9/1980 | Mirring | 308/217 |
| 4,288,129 | 8/1981 | Ryanen | 308/214 X |

FOREIGN PATENT DOCUMENTS 2069628 8/1981 United Kingdom .

*Primary Examiner*—John M. Jillions
*Assistant Examiner*—Thomas R. Hannon

*Attorney, Agent, or Firm*—Gravely, Lieder & Woodruff

[57] ABSTRACT

The cage of a tapered roller bearing has large and small end rings that extend respectively along the large and small end faces of the tapered rollers and in addition bridges that connect the end rings and maintain the proper spacing between the rollers. Each bridge includes a web that projects radially inwardly toward the bearing cone. One end of each web merges with the small end ring, while the other end forms a corner located inwardly from the large end ring. Indeed, the corner is located opposite to the thrust rib of the bearing cone. Each web in turn is provided with a groove that extends its full length, with the end located at the small end ring being closer to the axis of rotation than the end that is at the corner. During operation of the bearing, a liquid lubricant is directed into the space between the small end ring and the bearing cone. Some of this lubricant collects in the grooves at the small end of the cage, and by reason of the centrifugal forces generated by the rotation of the cage, this lubricant flows through the grooves and at the corner is discharged against that surface of the thrust rib against which the large end faces of the rollers bear. As a consequence, this critical surface area of the bearing receives adequate lubrication, even during high speed operation of the bearing.

20 Claims, 5 Drawing Figures

POLYMER CAGE FOR A HIGH SPEED TAPERED ROLLER BEARING

BACKGROUND OF THE INVENTION

This invention relates in general to antifriction bearings and more particularly to a cage capable of enabling a tapered roller bearing to operate at high speeds and also to a bearing assembly including such a cage.

In the typical tapered roller bearing the tapered rollers roll between an inner race, known as a cone, an outer race, known as a cup. Actually, the rollers contact the cup and cone along tapered raceways on those components and if each raceway is extended to an apex, the apexes of the two raceways would lie at a common point along the axis of rotation for the bearing. This configuration produces pure rolling contact between the rollers and the cup and cone raceways. It also causes transmitted radial loads to resolve into axial components at the rollers, these axial components being directed such that the rollers are urged toward the large ends of the raceways. To prevent the rollers from being expelled from the annular space between the cup and cone, the cone is usually provided with an outwardly directed rib that is capable of resisting the axial component exerted on the rollers. Thus, during operation of the bearing, the large diameter end faces of the rollers bear against, roll, and to a measure, slide along the cone thrust rib.

Unless a film of lubricant is maintained between the cone thrust rib and the roller end faces, the bearing will overheat and sustain damage. During low speed operation the tapered rollers tend to pump any lubricant that is within the bearing toward the thrust rib, and as a consequence the thrust rib usually receives an adequate supply of lubrication. However, during high speed operation, particularly with a rotating cone, the centrifugal forces imparted to the lubricant tend to direct it away from the thrust rib, and as a result the thrust rib and roller end faces become starved for lubrication. For this reason, conventional tapered roller bearings are usually not suited for high speed operation.

However, tapered roller bearings have many characteristics that are not found in angular contact ball bearings and other types of bearings that are currently used in high speed applications. For example, tapered roller bearings, by reason of the line contact between the raceways and the tapered rollers, will carry radial loads of extremely large magnitude. Also, they are capable of carrying thrust loading as well as radial loading, and when two single row bearings are mounted in opposition, the two bearings can be set up against each other to achieve the desired amount of end play or preload in the mounting. Furthermore, such a mounting is extremely stable.

SUMMARY OF THE INVENTION

One of the principal objects of the present invention is to provide a tapered roller bearing assembly that can operate at high speeds. Another object is to provide a tapered roller bearing assembly of the type stated having an extremely simple cage for conveying a liquid lubricant to the thrust rib of the bearing during high speed operation. A further object is to provide a bearing assembly of the type started in which the cage is molded from a polymer. An additional object is to provide a cage that is capable of enabling an otherwise conventional tapered roller bearing to operate at much higher speeds. Still another object is to provide a cage and bearing that are simple in construction and economical to manufacture. These and other objects and advantages will become apparent hereinafter.

The present invention resides in a tapered roller bearing assembly including a cone having a thrust rib at one end of its raceway, a cup, tapered rollers between the cup and cone, and a cage having large and small end rings extended respectively past the large and small ends of the tapered rollers, and bridges extended between the end rings. The bridges have inwardly directed webs, each provided with a groove that leads up to the thrust rib, with the end of the groove that is in the region of the small end ring being located closer to the axis of rotation than the end of the groove that is at the thrust rib. Thus, a liquid lubricant will flow through the grooves under the influence of centrifugal force and will be discharged along the thrust rib so as to lubricate the thrust rib where the tapered rollers bear against that rib. The invention also resides in the cage itself. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur

DETAILED DESCRIPTION

Figure 1:
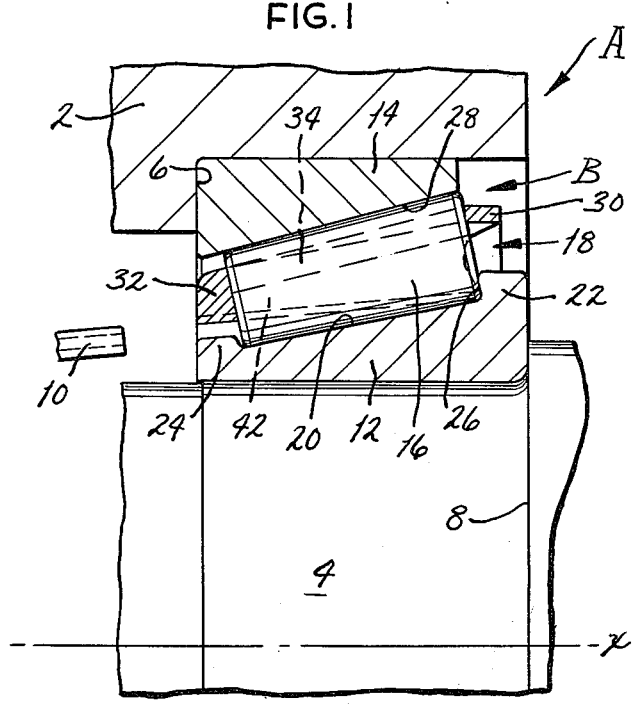
FIG. 1 is a sectional view of a bearing assembly having a tapered roller bearing provided with an improved cage constructed in accordance with and embodying the present invention.

Referring now to the drawings, a bearing assembly A (FIG. 1) includes a tapered roller bearing B, as well as a housing 2 which receives the bearing B and a shaft 4 which extends through the bearing B. By reason of the bearing B, the shaft 4 rotates easily relative to the housing 2 about an axis X of rotation, or the housing 2 may rotate about the shaft 4. At one end of the bearing B the housing 2 has an abutment 6, which may be a shoulder, and at the other end of the bearing the shaft 4 has an abutment 8, which may likewise be a shoulder or perhaps a nut. Indeed, the bearing B insofar as the axial direction is concerned is captured between the two abutments 6 and 8. In addition, the bearing assembly A includes several nozzles 10 which are disposed in the annular space between the housing 2 and the shaft 4 generally inwardly from the abutment 6. The nozzles 10 may be mounted on the housing 2 or on the shaft 4, and are connected to a source of liquid lubricant. They are directed toward the end of the bearing B so that when the liquid lubricant is pumped through them, that lubricant will flow into the bearing B.

The bearing B (FIG. 1) includes a cone 12, a cup 14 surrounding the cone 12, and tapered rollers 16 arranged in a single row between the cone 12 and cup 14.

All have the conventional configuration. In addition, the bearing B has a specially configured cage 18 which not only serves to maintain the correct spacing between the rollers 16, but further collects the liquid lubricant discharged from the nozzles 10 and distributes it within the bearing B such that the bearing B can be operated at considerably higher angular velocities, that is, at velocities higher than the bearing B would be capable of achieving if it were provided with a conventional cage.

The cone 12 fits over the shaft 4 and has an outwardly presented tapered raceway 20 around which the rollers 16 are disposed. In addition to the raceway 20, the cone 12 has a thrust rib 22 and a retaining rib 24 that project respectively beyond the large and small diameter ends of the raceway 20. The thrust rib 22 serves as an abutment for preventing the rollers 16 from being expelled during operation of the bearing B, it having an abutment surface 26 against which the large diameter ends of the rollers 16 bear. The back face of the cone 12, that is the cone face through which thrust loading is transmitted, is located on the opposite end of the thrust rib 22 where it is against the abutment 8 on the shaft 4. The retaining rib 24 prevents the rollers 16 from sliding off of the small end of the cone raceway 20 when the cone 12 is removed from the cup 14.

The cup 14 fits within the housing 2 and has an inwardly presented raceway 28 that surrounds the cone raceway 20. The cup back face is located at the small diameter end of the raceway 28, and this face is against the abutment 6 on the housing 2, so that thrust loads applied to the cup 14 are transmitted through it.

The tapered rollers 16 are arranged in a single row between the cone and cup raceways 20 and 28, there being line contact with the raceways 20 and 28. In this regard, the raceways 20 and 28 are on apex, meaning that if each were extended to an apex, those apexes would lie at a common point along the axis X of rotation. The large ends of the rollers 16 bear against the abutment face 26 for the cone thrust rib 22 and are thus positioned by the thrust rib 22. Indeed, the thrust rib 22 prevents the rollers 16 from being expelled from the space between the cone and cup raceways 20 and 28 when the bearing B is loaded. In this regard, a radial load applied to the bearing B, by reason of the tapered geometry, translates into an axial component at the rollers 16 and this component will expel the rollers 16 unless resisted.

Figure 3:
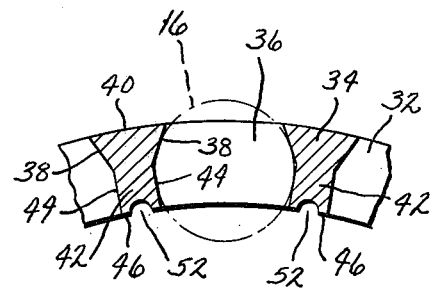
FIG. 3 is a sectional view of the cage taken along line 3—3 of FIG. 2 and showing the configuration of the cage bridges at the small end of the cage.
Figure 2:
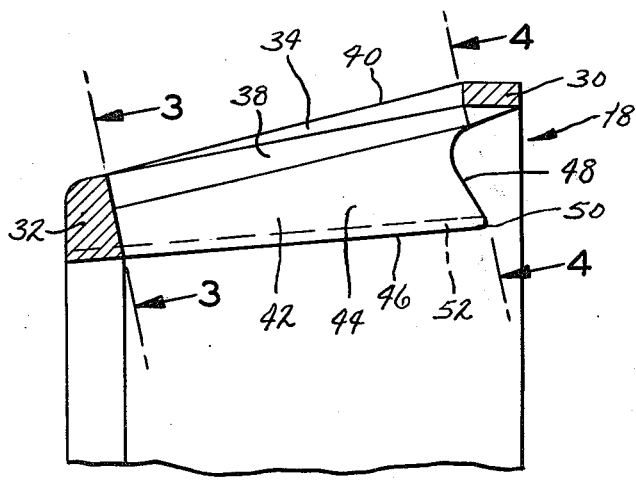
FIG. 2 is a fragmentary sectional view of the cage.
Figure 4:
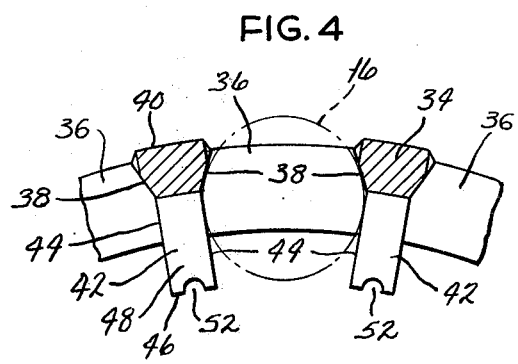
FIG. 4 is a sectional view of the cage taken along line 4—4 of FIG. 2 and showing the configuration of the cage bridges at the large end of the cage.
Figure 5:
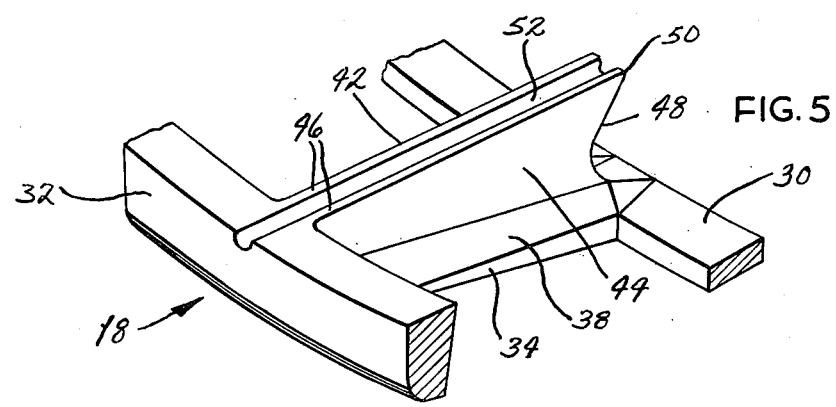
FIG. 5 is a fragmentary perspective view of the cage showing the position of a web on a cage bridge.

The cage 18, which is molded as an integral unit from a polymer, likewise fits between the cone and cup raceways 20 and 28 (FIG. 1), where it serves to maintain the proper spacing between the rollers 16 (FIGS. 3 & 4) and to further prevent the rollers 16 from dropping away from the cone 12 when the cone 12 is withdrawn from the cup 14. In addition, the cage 18 collects the liquid lubricant from the nozzles 10, conveys that lubricant through the spaces between the rollers 16, and discharges it against the abutment face 26 of the thrust rib 22, so that the thrust rib 22 is adequately lubricated, even during high speed operation of the bearing B.

More specifically, the cage 18 (FIGS. 2-5) at one end of the bearing B has a large diameter end ring 30 that encircles the thrust rib 22 and extends past the large diameter end faces of the rollers 16. At the opposite end of the bearing B, the cage 18 has a small diameter end ring 32 that encircles the cone retaining rib 24 and extends past the small diameter end faces of the rollers 16. However, the small end ring 32 is considerably thicker than the large end ring 30. The two end rings 30 and 32 are connected by bridges 34 that extend through the spaces between the rollers 16 and maintain the proper spacing between the rollers 16. Actually, the bridges 34 combine with the end rings 30 and 32 to form pockets 36 (FIGS. 3 & 4) within the cage 18, and it is within these pockets 36 that the rollers 16 are confined, even when the cone 12 is removed from the cup 14. To this end, each bridge 34 in its region closest to the cup raceway 28 has beveled surfaces 38 which converge inwardly toward the cone raceway 20. The beveled surfaces 38 at any point along the axis X of the bearing, lie for the most part beyond the pitch circle for the bearing B at that point. In this regard, the pitch circle is the circle defined by the centers of the rollers 16 at a plane that is normal to the axis X of the bearing B at any particular point along the axis X. The spacing between the two beveled surfaces 38 that line the sides of any pocket 36 is less than the diameter of the rollers 16, and this prevents the rollers 16 from dropping out of their pockets 36. Of course, since the rollers 16 are tapered, the pockets 36 which accommodate them are likewise tapered, and thus the spacing between the opposite beveled surfaces 38 that line any pocket 36 varies along the pocket 36. The two beveled surfaces 38 for any bridge 34 at their outer margins intersect an outer surface 40 that lies close to the cup raceway 28 with which it is generally parallel. Moreover, the outer surfaces 40 for the bridges 34 are flush with the outer surfaces for the large and small end rings 30 and 32. While the outer surfaces 40 for the bridges 34 lie close to the cup raceway 28, they do not contact that raceway.

The beveled surfaces 38 for any bridge 34 converge toward a web 42 which projects inwardly toward the cone raceway 20 and constitutes an integral part of the bridge 34. The web 42 has parallel side faces 44 that are presented toward and will contact the sides of the rollers 16, an inner surface 46 that is presented toward the cone raceway 20, and an end face 48 that is presented toward the abutment face 26 of the thrust rib 22 and otherwise faces out of the end of the bearing B. The spacing between the side faces 44 that line any pocket 36 is such that the roller 16 when snapped into the pocket 36 from the inside of the cage 18 will be retained within the pocket 36. At its one end, the inner surface 46 is flush with the inwardly presented surface of the small end ring 32, while at its other end it meets the end face 48 at a corner 50 (FIGS. 2 & 5) that is located opposite to the inner margin of the abutment face 26 on the cone thrust rib 22. Between its two ends, the inner surface 46 is planar or at least lies along a line that is oblique with respect to the axis X of the bearing B. The arrangement is such that the end which merges into the small end ring 32 is closer to the axis X than the end that is located at the corner 50. The end face 48 of the web 42 is somewhat concave and extends between the corner 50 and the ends of the beveled surfaces 38, and indeed continues along the ends of the beveled surfaces 38 to merge into the large end ring 30 so that the bridges 34 are extended axially along the inside surface of the large end ring 30.

The web 42 of each bridge 34 contains a lubricant channel or groove 52 (FIG. 5) that opens inwardly out of the inner surface 46 for the web 42 and toward the axis X of rotation. Thus, the grooves 52 open toward the cone raceway 20. Moreover, each groove 52 extends the full length of its web 42 and at the corner 50 opens out of the end face 48 for that web 42, so that one end of the groove 52 is presented toward the abutment face 26 of the cone thrust rib 22. The opposite end of each groove 52 continues through the small end ring 32 and opens out of the end of the small end ring 32 where it faces the nozzles 10. Each groove 52 is of constant depth throughout its length, and according its end that is within the small end ring 32 is closer to the axis X of rotation than its end that is located at the corner 50.

A suitable polymer from which the cage 18 may be molded is heat stabilized nylon 6/6, which is a common, commercially available, thermoplastic resin. Moreover, the configuration of the cage 18 is such that it can be extracted from the mold as a single unit.

In the operation of the bearing B, the shaft 4 normally rotates within the housing 2, which means that the cone 12 rotates while the cup 14 remains stationary. Even so, the complement of rollers 16 is carried around between the cone and cup raceways 20 and 28, and so is the cage 18. In other words, the cage 18 revolves with the cone 12, but at a lesser angular velocity. The cage 18 will likewise revolve if the shaft 4 remains stationary and the housing 2 rotates.

As the cage 18 rotates, the nozzles 10 direct the liquid lubricant into the space between the small end ring 32 of the cage 18 and the retaining rib 24 of the cone 12. Some of this lubricant enters those portions of the grooves 52 that are within the small end ring 32, and by reason of the inclination of the grooves 52, this lubricant flows though the grooves 52 under the influence of the centrifugal forces generated by the rotating cage 18. Stated differently, the portions of the grooves 52 that are within the small end ring 32 are closer to the axis X of rotation than the portions at the corners 50, and as a consequence, the lubricant flows outwardly through the grooves 52, that is, from the small end ring 32 to the corners 50. Not only does the centrifugal force propel the liquid lubricant through the grooves 52, but it further retains the lubricant within the grooves 52, even though the grooves 52 open toward the cone raceway 20 and may at times face downwardly. In any event, the liquid lubricant discharges from the grooves 52 at the corners 50 of the webs 42, and since those corners 50 are located opposite to the intersection of the abutment face 26 for the cone thrust rib 22, the lubricant is directed against the abutment face 26 which it lubricates. As a consequence, a thin film of lubricant is maintained between the large diameter end faces of the tapered rollers 16 and the abutment face 26 of the thrust rib 22, even during extremely high speed operation. Indeed, the flow of liquid lubricant through the grooves 52 increases with an increase in the angular velocity of the cage 18, which is of course dependent on the angular velocity of the cone 12 or cup 14, whichever is the rotating component of the bearing B. Since a film of lubricant is maintained at the abutment face 26, the bearing B will not be damaged at this most critical area. Being concave, the end faces 48 of the webs 42 do not wipe the lubricant from the abutment face 26 of the thrust rib 22.

This invention is intended to cover all changes and modifications of the example of the invention herein chosen for purposes of the disclosure which do not constitute departures from the spirit and scope of the invention.

What is claimed is:

1. In a tapered roller bearing assembly including a cone having an outwardly presented tapered raceway and a thrust rib at the large diameter end of the raceway; a cup surrounding the cone and having an inwardly presented tapered raceway located opposite, but spaced from the raceway of the cone; and tapered rollers arranged in a row between the raceways of the cone and cup with the large diamenter ends of the rollers being presented toward and normally against the thrust rib, an improved cage for maintaining the correct spacing between the rollers, and for further directing a liquid lubricant to the thrust rib of the cone, said cage comprising: a large end ring that extends past the large ends of the rollers; a small end ring that extends past the small ends of the rollers; and bridges that extend between the two end rings and together with the end rings form pockets in which the rollers are contained, whereby the bridges separate adjacent rollers and maintain the correct spacing between the rollers, the bridges being at least in part located beyond the pitch circle for the rollers where they are configured to prevent the rollers from falling away from the cone when the cone is detached from the cup, at least some of the bridges having webs that project inwardly past the pitch circle and toward the cone raceway, each web extending substantially the entire length of the rollers so that one end of the web is located opposite the small end of the cone raceway and the other end is located opposite the large end of the cone raceway, each web having a groove that opens toward the cone raceway with the end of the groove that is located opposite the small end of the cone raceway being extended axially into the small end ring and further being closer to the axis of rotation for the bearing than the end of the groove that is located opposite the large end of the cone raceway, whereby a liquid lubricant that is introduced into the groove at the small end ring will flow through the groove under the influence of the centrifugal force in the rotating cone to be discharged from the groove in the region of the thrust rib so that the thrust rib remains lubricated as the large end faces of the rollers move along it.

2. The structure according to claim 1 wherein the thrust rib has an abutment face that is located at the large end of the cone raceway and the rollers bear against the thrust rib at its abutment face, wherein each web at the large end of the cone raceway terminates at an end face that is located opposite to and in close proximity to the abutment face of the thrust rib, and the grooves extend to the region of the end faces on the webs.

3. The structure according to claim 2 wherein the grooves at their ends located at the large end of the cone raceway open out of the end faces of the webs.

4. The structure according to claim 2 wherein the webs have inner surfaces out of which the grooves open, and the end faces and inner surfaces of the webs intersect at corners that are located near the innermost portion of the abutment face for the thrust rib.

5. The structure according to claim 4 wherein the end faces of the webs are concave such that they are closest to the abutment face at their corners.

6. The structure according to claim 5 wherein the grooves at their ends open out of the end faces of the webs.

7. The structure according to claim 1 wherein the small end ring of the cage has an inner surface that is spaced outwardly from the cone and is flush with the inner surfaces of the web; and wherein the grooves extend through and also open out of the inner surface of the small end ring.

8. The structure according to claim 7 wherein the small end ring of the cage has an end face which is presented away from the small ends of the rollers; and wherein the ends of the grooves open out of the end face of the small end ring.

9. The structure according to claim 7 and further comprising means for directing a liquid lubricant into the space between the inner surface of the small end ring for the cage and the cone.

10. The structure according to claim 1 where the end rings are formed integral with the bridges and the webs are likewise formed integral with their respective bridges, so that the cage is an integral one-piece structure.

11. The structure according to claim 1 wherein the cage is formed from a polymer.

12. The structure according to claim 1 wherein each web has side faces that are substantially parallel.

13. A cage for a tapered roller bearing, said cage being concentric about an axis of rotation and comprising: a large end ring, a small end ring spaced axially from the large end ring, bridges extended between the large and small end rings and together with the end rings forming pockets that are configured to confine the rollers for the bearing, each bridge having beveled surfaces along its sides with the beveled surfaces converging inwardly toward the axis of rotation, each bridge further having a web that is located inwardly from the beveled surfaces, there being at each web a groove which extends axially from a location within the small end ring, along the web, generally to the axial position of the large end ring where it is spaced inwardly from the large end ring, the groove opening inwardly toward the axis of rotation and being closer to the axis of rotation in the region of the small end ring than in the region of the large end ring.

14. A cage according to claim 13 wherein the large end ring is located radially outwardly from the grooves in the webs of the bridges, and each web further has an end face that extends generally from the large end ring to the groove.

15. A cage according to claim 14 wherein the end face of each web is concave and the groove for that web at its one end opens out of the end face.

16. A cage according to claim 15 wherein the inwardly presented surfaces of the webs and small end rings are generally flush and the grooves also extend completely through and open out of the end of the small end ring.

17. A cage according to claim 13 wherein the small and large end rings are formed integral with the bridges and the webs are likewise formed integral with their respective bridges, and wherein the cage is molded from a polymer.

18. A cage according to claim 13 wherein each web has side faces that are parallel and merge into the beveled faces for the web.

19. A cage for a tapered roller bearing, said cage being concentric about an axis of rotation and comprising: a large end ring, a small end ring spaced axially from the large end ring, bridges extended between the large and small end rings and together with the end rings forming pockets that are configured to confine rollers for the bearing, each bridge having beveled surfaces along its sides with the beveled surfaces converging inwardly toward the axis of rotation, each bridge further having a web that projects inwardly from the beveled surfaces and from the large end ring, with the web having an inner surface that is presented toward the axis of rotation and a concave surface that is located adjacent to and leads up to the large end ring, the inner and concave surfaces of the web intersecting at a corner and forming a generally axially directed projection on the web, each web having a groove which extends along its inner surface from the small end ring to the corner, the groove opening inwardly toward the axis of rotation and being closer to the axis of rotation in the region of the small end ring than in the region of the corner.

20. A cage according to claim 19 wherein the small end ring has an inwardly presented surface that is flush with the inner surfaces of the webs; and wherein the grooves extend into the small end ring and open out of the inwardly presented surface of the small end ring.

* * * * *